Patented June 9, 1936

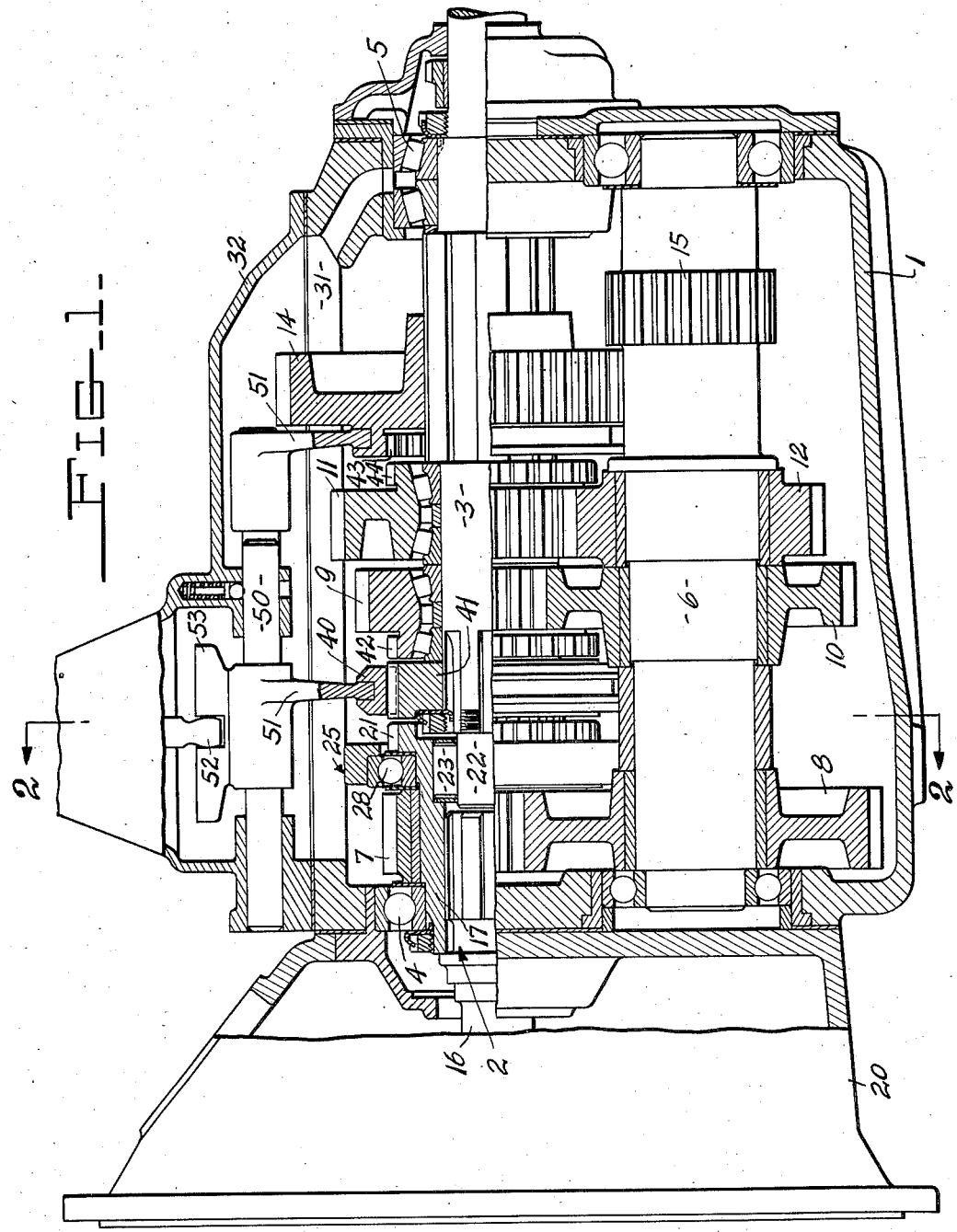

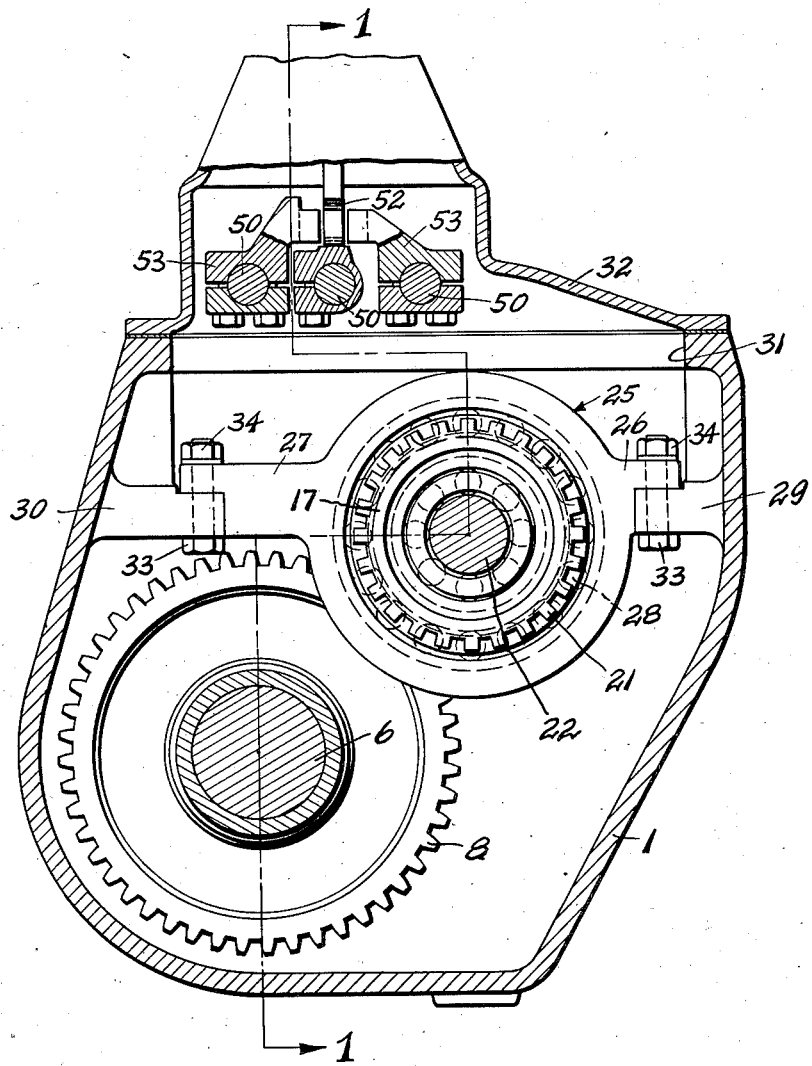

2,043,446

UNITED STATES PATENT OFFICE 2,043,446

INTERMEDIATE BEARING FOR TRANSMISSION GEARING

Carl D. Peterson, Toledo, Ohio, assignor to Spicer Manufacturing Corporation, Toledo, Ohio, a corporation of Virginia Application September 27, 1932, Serial No. 635,064

1 Claim. (Cl. 308—22)

This invention relates to transmission gearing of the type in which the driving and driven elements or shafts are arranged in axial alinement and one, usually the driven shaft has a pilot bearing in the other; and has for its object, an intermediate bearing for supporting the driving and driven elements at a point concentric with the pilot bearing, or in the plane of the pilot bearing, which intermediate bearing is easily removable and replaceable or easily reassembled in the housing with the driving and driven elements through the open top of the housing.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a gearing embodying my invention, the same being taken on line 1—1, Figure 2.

Figure 2 is a transverse sectional view taken approximately on line 2—2, Figure 1.

1 designates the housing or gear box. 2 designates generally the driving element and 3, the driven element, or transmission shaft, these being journalled in suitable bearings 4, 5 in opposite end walls of the housing 1.

6 is the countershaft journalled in the opposite end walls. The driving and transmission elements are connectible together in direct drive relation and also at various other speeds including reverse through gears on the driving and driven elements and the countershaft, some of which gears are shiftable.

7 and 8 designate respectively a pair of intermeshing gears on the driving element 2 and the countershaft 6 respectively for transmitting the motion of the driving element to the countershaft. 9 and 10 are a pair of gears on the transmission shaft 3 and countershaft 6. 11 and 12 are another pair of gears on these shafts. 14 and 15 are gears forming part of the reverse gear train. The gears 9 and 11 are normally disconnected from the transmission shaft and connectible thereto as will be hereinafter described. The gear 14 is rotatable with the transmission shaft 3 and is slidably mounted thereon.

The transmission gearing here illustrated is particularly designed for heavy duty where an intermediate bearing around the pilot bearing between the driving and driven elements is particularly desired. In ordinary transmissions, the driving element is a shaft with a socket or recess at its inner end in which the inner end of the transmission shaft is journalled. In this heavy duty transmission, the driving element comprises a shaft 16 and a sleeve 17 splined to the shaft 16 within the housing and extending beyond the inner end of the shaft forming a recess for a pilot bearing. The sleeve coacts directly with the antifriction bearing 4 in the front wall of the housing and the gear 7 is mounted on the sleeve to rotate therewith. As will be understood, the shaft 16 extends into the clutch housing 20 and the shiftable member of the clutch within the housing is mounted thereon. The sleeve has a clutch face 21 at its inner end for coacting with a shiftable clutch to be presently described for connecting the driving and driven elements 2, 3 in direct drive relation.

The driven shaft 3 has an axial extension or stud 22 extending into the recess formed by the end portion of the sleeve 17 and journalled in suitable antifriction bearings 23 in the recess, this construction forming the pilot bearing between the driving element 2 and the transmission shaft 3.

25 designates the intermediate bearing, which includes a ring surrounding the abutting ends of the driving shaft 2 and the driven shaft 3 and located concentric with the pilot bearing, and means, as brackets 26 and 27, extending laterally therefrom and detachably secured to the opposite side walls of the housing, a suitable antifriction bearing 28 being interposed between the ring 25 and the portion of the sleeve 17 which extends beyond the end of the shaft 16.

As here illustrated, the brackets or arms 26, 27 are secure to inwardly projecting lugs or shelves 29, 30 on opposite side walls of the housing and are detachably secured thereto as to be readily assembled with the shafts through the open top 31 of the housing, when the cover plate 32 is removed. As here illustrated, the brackets 26, 27 are secured to the shelves 29, 30 by bolts 33, extending upwardly through lapping portions of the arms 26, 27 and shelves 29, 30 and having nuts 34 on their upper end where they are readily accessible through the open top of the housing. By this construction, the countershaft and gears thereon can be first assembled in the housing and afterwards the intermediate bearing and the driving and driven elements with the gears and other parts thereon be assembled in the housing.

40 designates a shiftable clutch section having internal teeth slidably interlocking with external teeth on a collar 41 keyed to the inner end of the transmission shaft 3 and slidable axially in one direction to engage the internal teeth with the external teeth of the clutch face 21 and thus connect the driving and driven elements in direct drive relation and in the opposite direction from neutral to engage its internal teeth with the external teeth of a clutch face 42 at one side of the gear 9, and thus connect the driving and driven elements through the gears 7, 8, 10, 9. The shiftable gear 14 which is rotatable with the shaft 3 is provided with an internal clutch face 43 on one side thereof and is shiftable to engage the clutch face 43 with the clutch face 44 on the gear 11, and thus lock the gear 11 to the transmission shaft, so that the power will be transmitted through the gears 7, 8, 12 and 11. Reverse speed is produced through a double gear idler not shown, shiftable into mesh with the gears 14 and 15, when the gear 14 is in the position shown in Figure 1. The gearing shifting arrangement and mechanism forms no part of this invention, and further description is thought to be unnecessary.

The shifting elements are shifted by means of shift rods 50 connected to the various elements through suitable forks 51 and the shift rods are selected and shifted by means of a selecting and gear shifting lever having the usual finger 52 at its lower end for selecting any of the shift rods or shift blocks 53 thereon.

This invention relates primarily to an intermediate bearing concentric with and around the pilot bearing between the driving and driven elements or shafts. This intermediate bearing is particularly advantageous in that it can be readily assembled in the gear box without interfering with the assembling of the other shafts and gears and firmly supports the abutting end of the driving and driven shafts in axial alinement, particularly in heavy duty transmission gearings.

What I claim is:

In a transmission gearing, the combination with a gear box open at its top, and a gear set in the gear box including driving and driven shafts mounted in axial alinement in opposite end walls of the housing and one having a pilot bearing in the other, a countershaft journalled in the end walls to below the level of the former shafts and coacting gearing on the shafts; of a self-contained intermediate bearing around the pilot bearing detachably mountable in the gear box through the open top thereof bridging from one side wall of the box to the other above the countershaft so that it and its supports are entirely off and spaced from the bottom of the gear box, and having supporting means detachably secured to the side walls of the gear box, and a cover for the box removable and replaceable independently of the bearing.

CARL D. PETERSON.